United States Patent
Uhler

(10) Patent No.: US 11,808,375 B2
(45) Date of Patent: Nov. 7, 2023

(54) ELECTRICALLY CONTROLLED VALVE ACTUATOR

(71) Applicant: AKRON BRASS COMPANY, Wooster, OH (US)

(72) Inventor: Adam Uhler, Sterling, OH (US)

(73) Assignee: AKRON BRASS COMPANY, Wooster, OH (US)

( * ) Notice: Subject to any disclaimer, the term of this patent is extended or adjusted under 35 U.S.C. 154(b) by 0 days.

(21) Appl. No.: 17/097,054

(22) Filed: Nov. 13, 2020

(65) Prior Publication Data

US 2021/0140557 A1 May 13, 2021

Related U.S. Application Data

(60) Provisional application No. 62/934,780, filed on Nov. 13, 2019.

(51) Int. Cl.
  *F16K 31/60* (2006.01)
  *F16K 31/04* (2006.01)
  (Continued)

(52) U.S. Cl.
  CPC ............ *F16K 31/043* (2013.01); *F16K 31/60* (2013.01); *F16H 37/041* (2013.01); *F16H 57/02* (2013.01);
  (Continued)

(58) Field of Classification Search
  CPC ..... F16K 31/043; F16K 31/055; F16K 31/535
  (Continued)

(56) References Cited

U.S. PATENT DOCUMENTS 3,070,345 A * 12/1962 Knecht ................. F16K 15/035
  251/212
4,616,803 A * 10/1986 Schils ................... F16H 59/041
  251/285

(Continued)

FOREIGN PATENT DOCUMENTS

EP   0730114 A1   9/1996
GB   2333144 A    7/1990

OTHER PUBLICATIONS

Extended European Search Report from corresponding European Application No. 20207635.2 dated Apr. 12, 2021.
(Continued)

*Primary Examiner* — Matthew W Jellett
(74) *Attorney, Agent, or Firm* — TUCKER ELLIS LLP; Michael G. Craig

(57) ABSTRACT

One or more techniques and/or systems are disclosed for an actuator design that comprises a compact package, a more efficient use of power, and dual manual overrides for easy access. An electrically operated motor provides rotational power to a series of gears in a gearbox. The gears reduce speed and increase torque, and rotate a worm shaft gear that is engaged with a worm gear. The worm shaft gear is disposed parallel to the motor, and the worm gear rotates at a ninety degree angle from the rotation of the motor. The worm gears is coupled with a trunnion, which is engaged with a ball of a valve. Rotation provided by the motor to the gears is transferred to the worm shaft gear, which provides rotation to the worm gear, to the trunnion, resulting in rotation of the ball in the valve.

19 Claims, 16 Drawing Sheets

(51) Int. Cl.
*F16H 37/04* (2006.01)
*F16H 57/02* (2012.01)
*F16K 5/06* (2006.01)

(52) U.S. Cl.
CPC .. *F16H 2057/02034* (2013.01); *F16K 5/0652* (2013.01)

(58) Field of Classification Search
USPC ............... 251/129.03, 129.11, 129.12, 249.5
See application file for complete search history.

(56) References Cited

U.S. PATENT DOCUMENTS

| | | | | |
|---|---|---|---|---|
| 4,965,513 | A | | 10/1990 | Haynes et al. |
| 4,994,001 | A | * | 2/1991 | Wilkinson ......... F16H 37/0826 251/129.03 |
| 5,503,045 | A | * | 4/1996 | Riester ................. F16K 31/046 251/80 |
| 5,564,461 | A | * | 10/1996 | Raymond, Jr. ......... F16K 31/00 137/315.35 |
| 5,954,088 | A | * | 9/1999 | Huang ................... F16K 31/16 137/315.21 |
| 6,003,837 | A | * | 12/1999 | Raymond, Jr. ....... F16K 31/045 251/129.12 |
| 6,079,442 | A | * | 6/2000 | Raymond, Jr. ....... F16K 31/045 137/554 |
| 6,371,440 | B1 | * | 4/2002 | Genga ................... F16K 31/046 251/129.03 |
| 6,994,320 | B2 | * | 2/2006 | Johnson ................. F16K 7/126 251/291 |
| 7,055,795 | B2 | * | 6/2006 | Lay ....................... F16K 31/055 251/129.03 |
| 8,342,478 | B1 | * | 1/2013 | Cordray ............... F16K 31/055 251/129.03 |
| 9,046,168 | B2 | * | 6/2015 | Hsu ...................... F16K 31/535 |
| 9,958,084 | B2 | * | 5/2018 | Prahl .................... F16K 31/043 |
| 2005/0035319 | A1 | * | 2/2005 | Sanada .................. B60T 8/368 251/129.01 |

OTHER PUBLICATIONS

"Electric Valves Brochure", Banjo Liquid Handling Products, Banjo Corporation, 3 pages.
"E14X and E16X Electric Valve Actuators", Elkhart Brass, 2 pages.
"LH—Electric Actuators", Lapar Control Valve, 7 pages.
"Customized Fluid Management Solutions", KZ Valve Catalog, 74 pages.

* cited by examiner

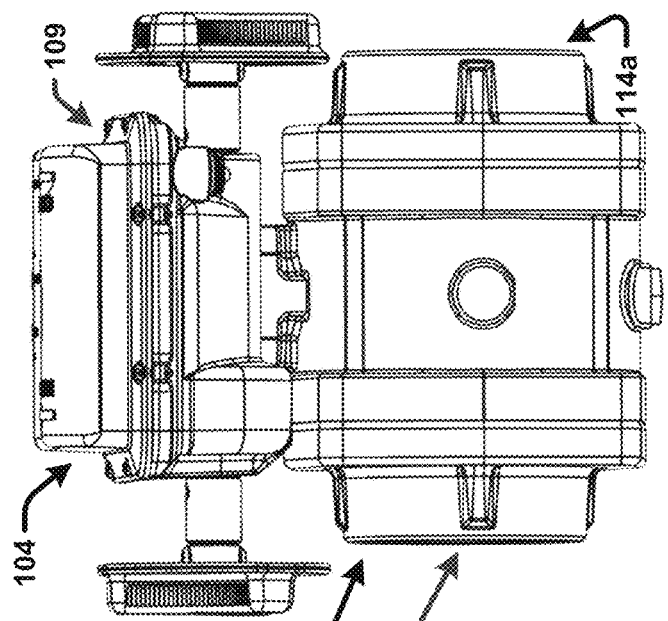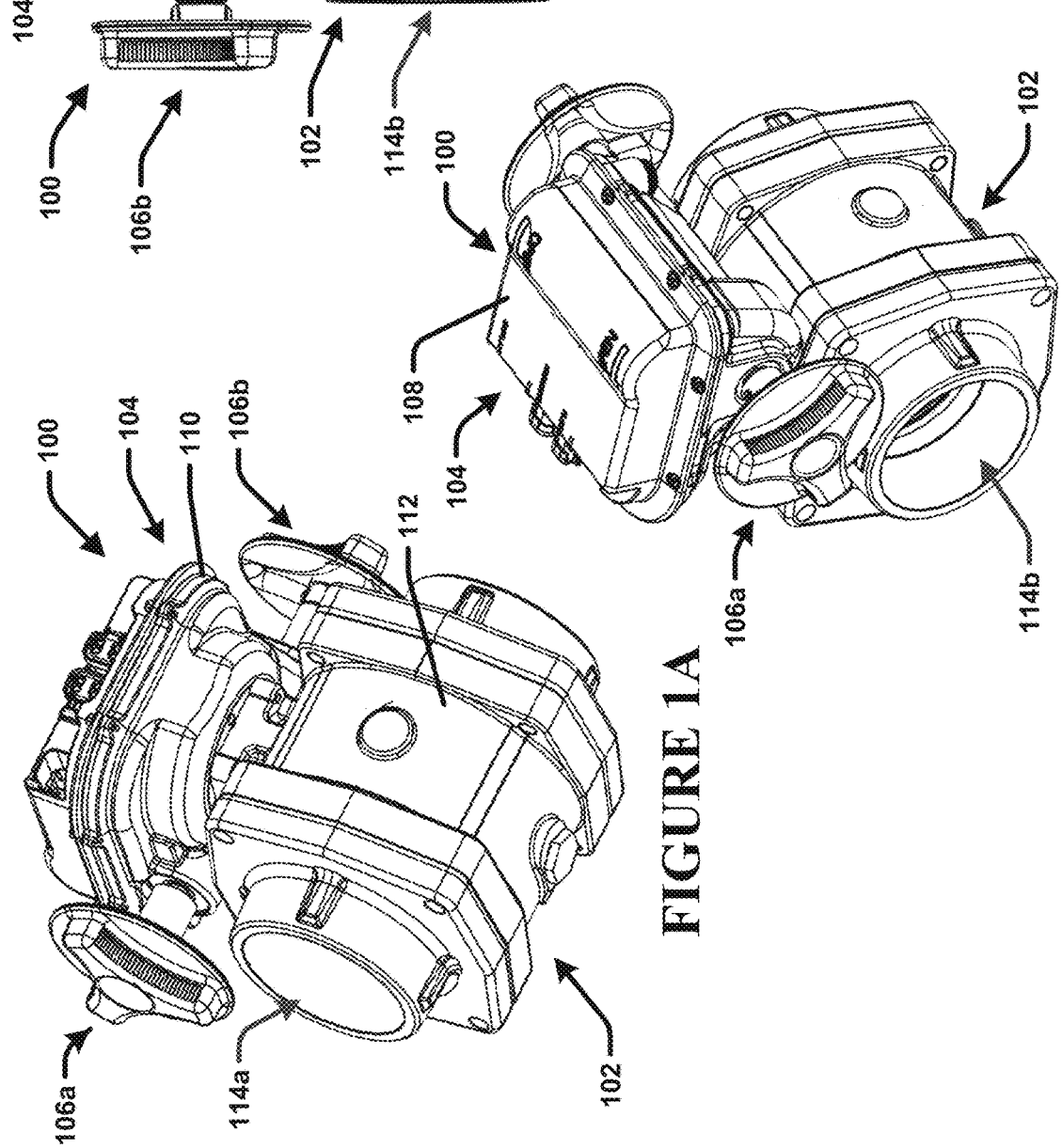

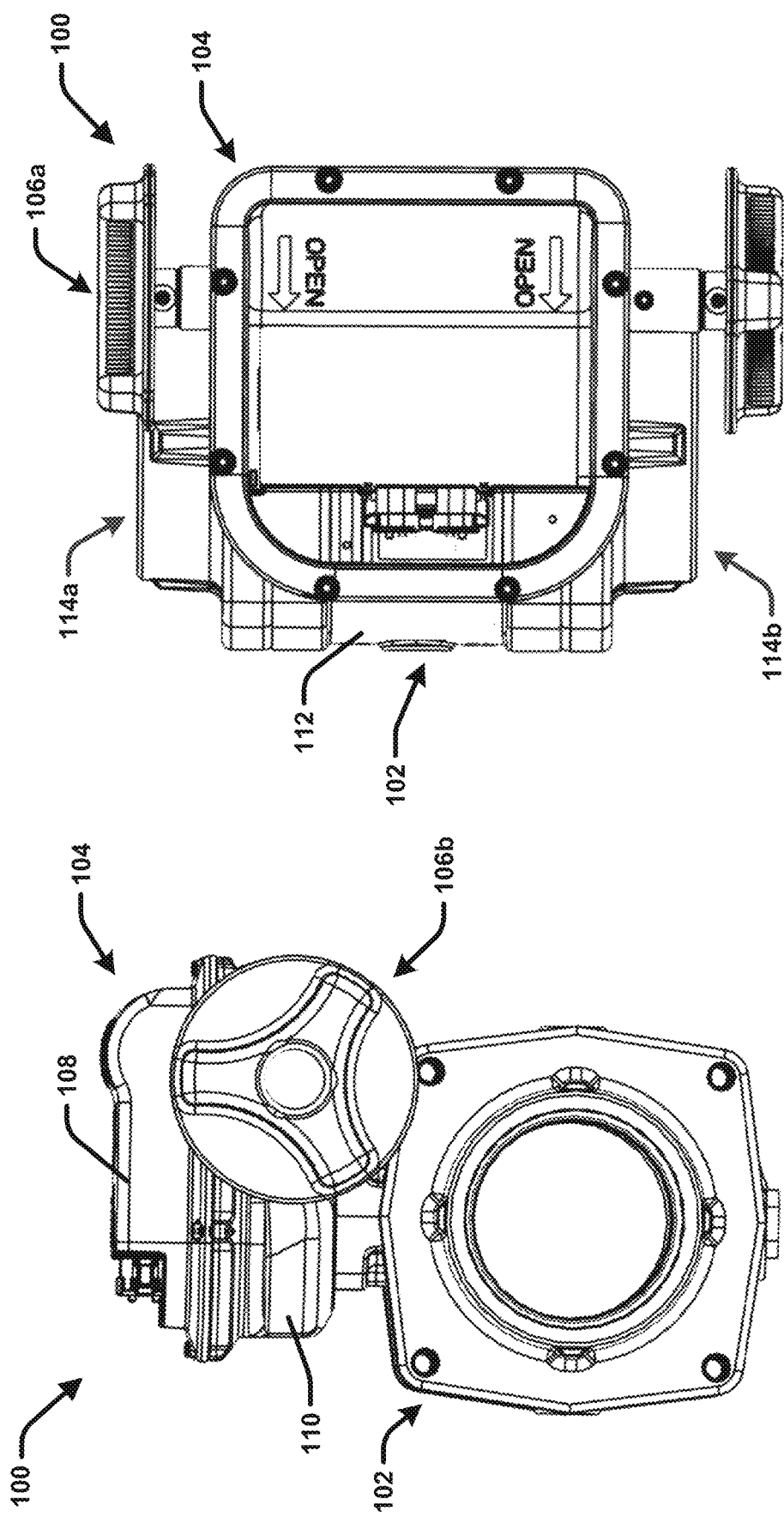

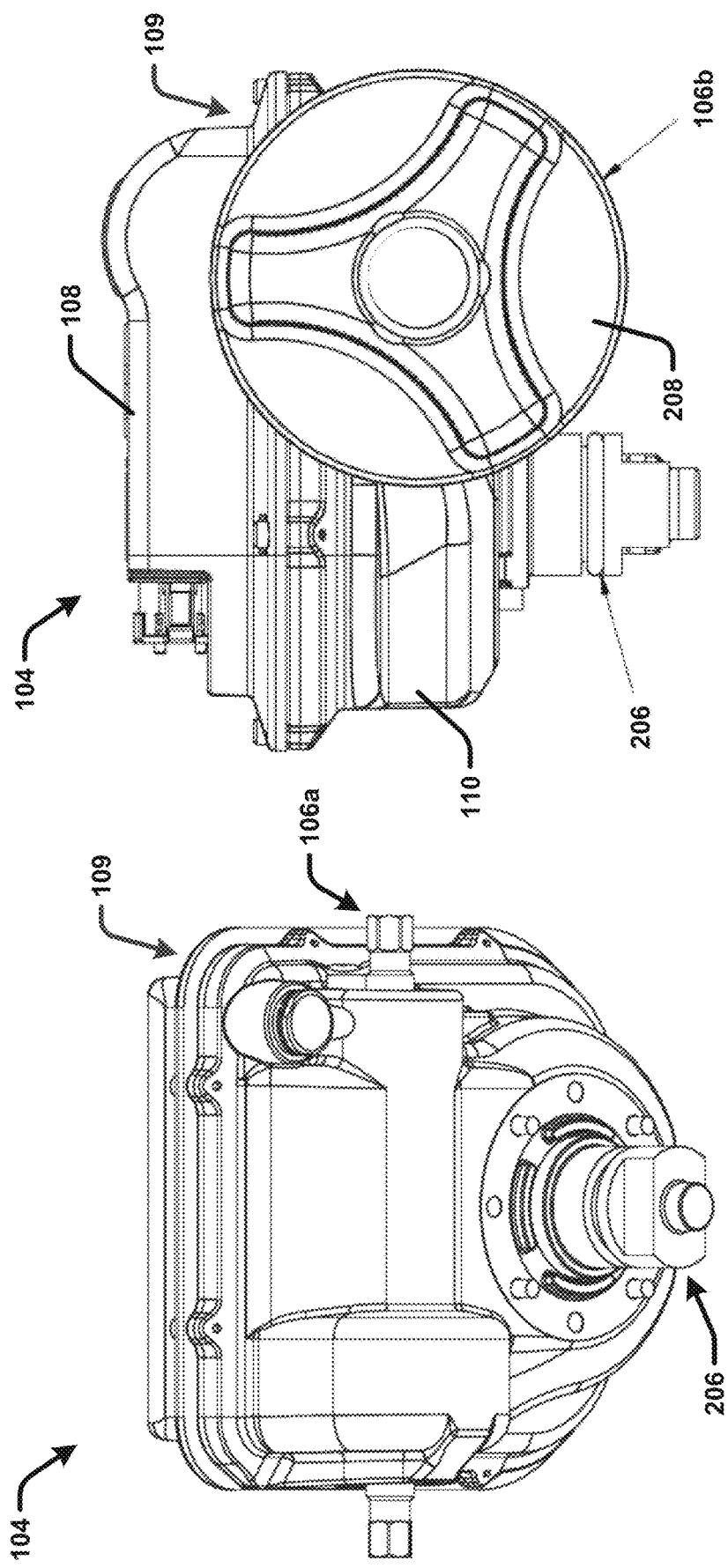

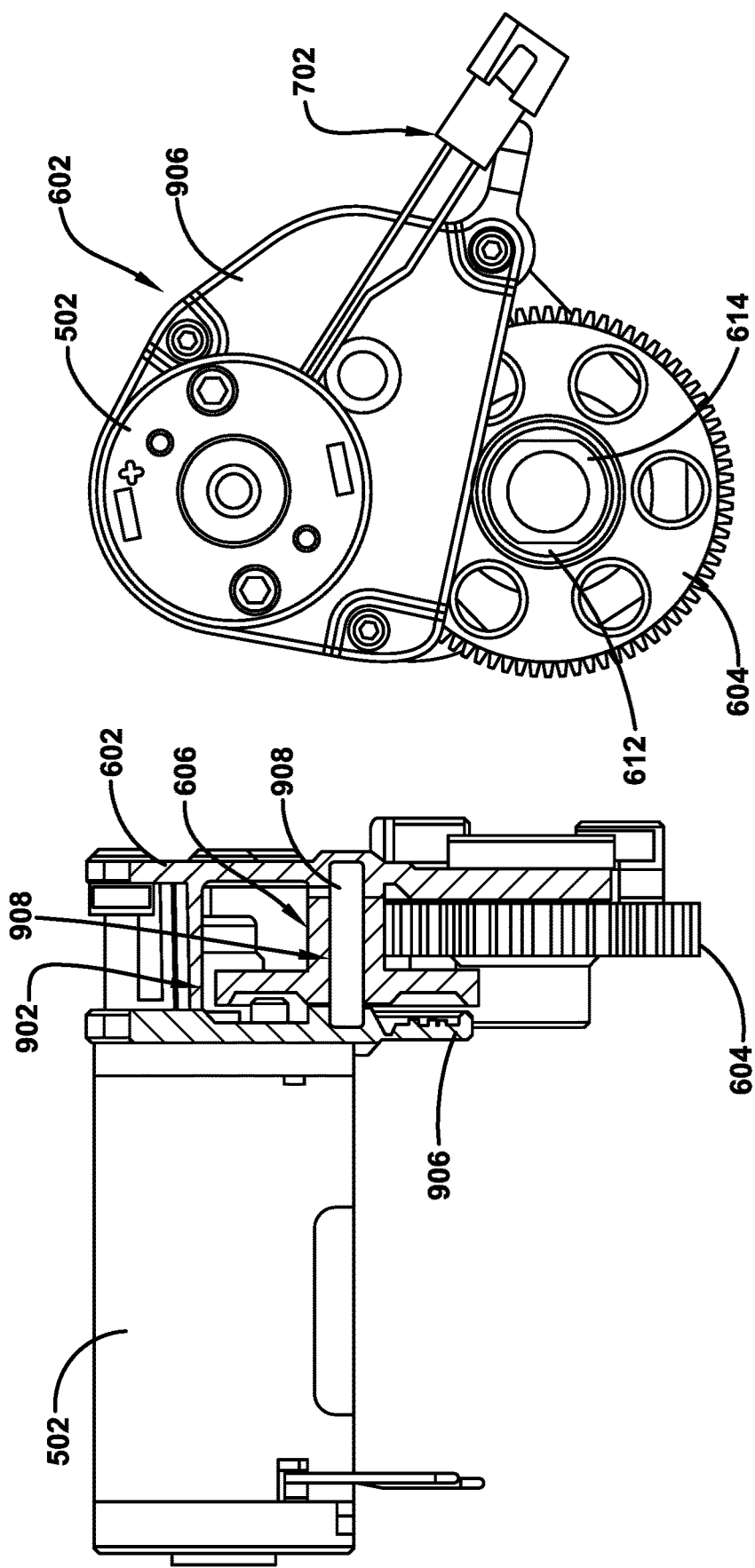

ELECTRICALLY CONTROLLED VALVE ACTUATOR

CROSS REFERENCE TO RELATED APPLICATIONS

This application claims priority to U.S. Ser. No. 62/934,780, entitled ELECTRICALLY CONTROLLED VALVE ACTUATOR, filed Nov. 13, 2019, which is incorporated herein by reference.

BACKGROUND

Fire suppression systems comprise various forms, from mobile systems to stationary single purpose systems. A plurality of components may be used to provide fire suppression operations, such as valves, pumps, hoses, nozzles and other fluid discharge devices. Scene automation can facilitate operation of one or more components used, including operation of valves. A valve actuator is a mechanism used to move the valve between a closed and an open position. Manually operated valves typically need an operator position at the actuator to adjust the valve, while a power-operated actuator can use gas pressure, hydraulic pressure or electricity, to adjust the valve. Further, a remotely controlled actuator can control the valve position from a remote position.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, an actuator that may be used on a valve to move it between open and closed, such as a ninety degree rotation. The actuator can be manually operated or powered for operation, and may be remotely controlled to move the valve. The actuator can be constructed in a compact size, and can have a manual override that extend out of a front portion of the valve, as well as a back portion of the valve. In some implementations, the valve can be oriented in four different positions, where each position is a ninety degrees rotation from a neighboring position.

In one implementation, an actuator can comprise a top and bottom housing and a trunnion projecting from the bottom housing, which can be engaged with a valve to operate the valve. The actuator can comprise an electrically controlled motor, which provides rotational power to a gear box comprising one or more spur gears, used to increase torque and reduce rotation speed. The gears are engaged with a worm shaft gear, which is further engaged with a worm gear disposed at ninety degrees from the rotation of the motor. The motor is disposed parallel with the worm shaft gear, and at a ninety degree angle from a trunnion engaged with the worm gear. The motor provides rotational power to the gears, which reduce the speed and increase torque applied to the worm shaft gear. The worm shaft gear rotates the worm gear, which rotates the trunnion. The trunnion is engaged with a ball in the valve, which opens and closes in response to the motor providing rotational power. The actuator provides a compact design, which improves efficiency, lowers vibration, and reduces power needs. The worm shaft gear can comprise manual actuator overrides on either end, projecting from the actuator, allowing an operator to manually operate the actuator in a compact space.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein:

FIGS. 1A-1E are component diagrams illustrating various views of an example valve and actuator assembly.

FIGS. 2A-2C are component diagrams illustrating views of an example embodiment of an actuator which may be implemented in one or more systems described herein.

FIGS. 11A and 11B are component diagrams illustrating views of an example embodiment of one or more portions of an actuator which may be implemented in one or more systems described herein.

DETAILED DESCRIPTION

Figure 2C:
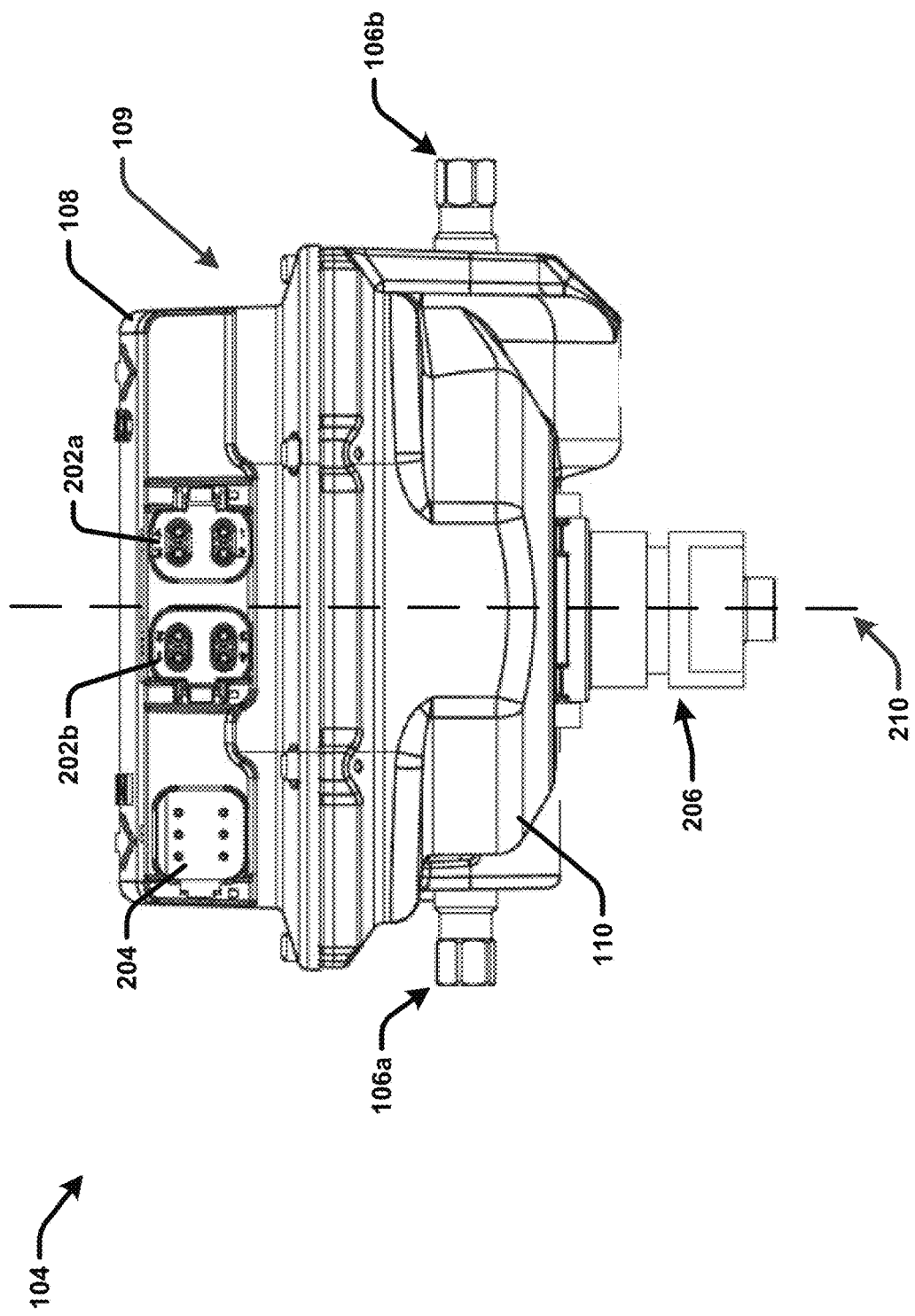

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices may be shown in block diagram form in order to facilitate describing the claimed subject matter.

In one aspect, a valve that is used to direct fluid, such as from one conduit to another or to open and close fluid flow from or to a conduit, can comprise an actuator used to operate the valve. In one implementation, in this aspect, the actuator can be active by power, such as electrically powered, to operate the valve. Further, the powered operation can be remotely controlled, to remotely control the operation of the actuator and hence the valve and fluid flow.

FIGS. 1A, 1B, 1C, 1D, and 1E are component diagrams that illustrate an example implementation of a valve and actuator assembly 100. In this implementation, the assembly comprises a valve 102 and an actuator 104. Here, the valve 102 comprises a flow passage having an inlet/outlet 114a, 114b disposed at two different (e.g., opposing) sides to direct the flow of fluid from one conduit to another, attached to the valve 102, for example. The valve 102 can comprise a valve housing 112 and, in some implementations, a valve ball (not shown).

In this implementation, the actuator 104 can comprise a housing 109, which can comprise a top housing 108 and a bottom housing 110. Further, the actuator 104 can comprise a first manual actuator override 106a and, in some implementations, a second manual actuator override 106b. As an example, the respective manual actuator overrides 106 can be used to manually operate the actuator 104 in lieu of powered (e.g., by motor) operation of the actuator 104. Further, in this implementation, as illustrated, the respective manual actuator overrides 106 can be disposed on either side of the actuator 104, external to the housing, which may allow an operator easier access to the manual actuator overrides 106 when installed on a piping system. As an example, the respective manual actuator overrides 106 can be used to operate the valve 102 manually. The manual actuator override 106 can comprise a first end that is engaged with the worm shaft gear 402, and a second end that is disposed outside of the housing 109. As an example, the second end of the first manual actuator override 106a can be disposed on a first side of the housing 109, and the second end of the second manual actuator override can be disposed at a second (e.g., opposing) side of the housing 109.

Additionally, the actuator 104 may be installed on the valve 102 in at least four different positions or configurations, respectively ninety degrees of rotation apart from an adjacent position. That is, for example the actuator 104 can be installed on top of the valve 102 in a first position, a second position ninety degrees of rotation from the first position, a third position one-hundred and eighty degree rotation from the first position, and a fourth position two-hundred and seventy degrees rotation from the first position. As another example, the bottom portion of the housing is configured to be selectably fastened to the valve assembly 102 in four different configurations that comprise: a front side 310 of the housing 109 aligned with a first side 350 of the valve assembly 102, the front side 310 of the housing 109 aligned with a second side 352 of the valve assembly 102, the front side 310 of the housing 109 aligned with a third side 354 of the valve assembly 102, and the front side 310 of the housing 109 aligned with a fourth side 356 of the valve assembly 102. Notably, in this implementation, the actuator 104 is configured to be operably installed in a substantially centered disposition over the center of the valve 102, which may provide for more stable rotation of the ball.

FIGS. 2A, 2B, and 2C are component diagrams illustrating one example implementation of the actuator 104, which may be coupled with a valve (e.g., 102 of FIG. 1. As illustrated, the actuator can comprise a trunnion 206 that projects from a bottom of the actuator housing. The trunnion is configured to operably rotate around a first vertical axis 210. The trunnion 206 can be used to transfer mechanical power from the actuator 104 to the valve 102 (e.g., ball valve). That is, for example, the trunnion 206 can be operably (in operation), fixedly (e.g., selectively fixed) engaged with a ball of a ball valve 102, and apply torque (rotational force) to the ball, which is provided by the actuator 104, thereby rotating the ball of the ball valve. Further, as illustrated, the actuator 104 can comprise a manual actuator override handle 208 that is operably fixedly engaged with the respective manual actuator overrides 106a, 106b. As an example, the manual actuator override handle 208 can be manually rotated to rotate the coupled manual actuator overrides 106, which in turn can rotate the trunnion 206 to rotate the valve.

As illustrated in FIG. 2C, the actuator 104 can comprise a first sensor coupling 202a, a second sensor coupling 202b, and a communications and/or power coupling 204. It will be appreciated that the actuator 104 could comprise a third, or more, sensor couplings, and could comprise additional communications or power link couplings. In this implementation, for example, the one or more sensor coupling 202a, 202b could be used to send data (e.g., or have data pulled/polled) from (e.g., and provide power to) coupled sensors, such as a flow sensor (e.g., flow rate of fluid), a pressure sensor (e.g., pressure of fluid), and others. Additionally, the communications coupling 204 may be used to send data (e.g., or have data pulled/polled) from the actuator, such as position data, health data, power indications, etc., which can be used to provided information to a user, such as on a display, user interface, or connected computer (e.g., tablet, portable device, station, etc.), or to a communications bus, such as a CAN bus. The communication coupling may also be used by the actuator (e.g., or components therein) to receive state data, commands, instructions, or other information that can be used by the actuator (e.g., a processor therein) to alter the state of the actuator (e.g., move the valve ball). In some implementations the respective couplers 202, 204 can be connected to a wired communication; and in other implementations the respective couplers 202, 204 can be wireless coupled to a communication system.

Figure 3:
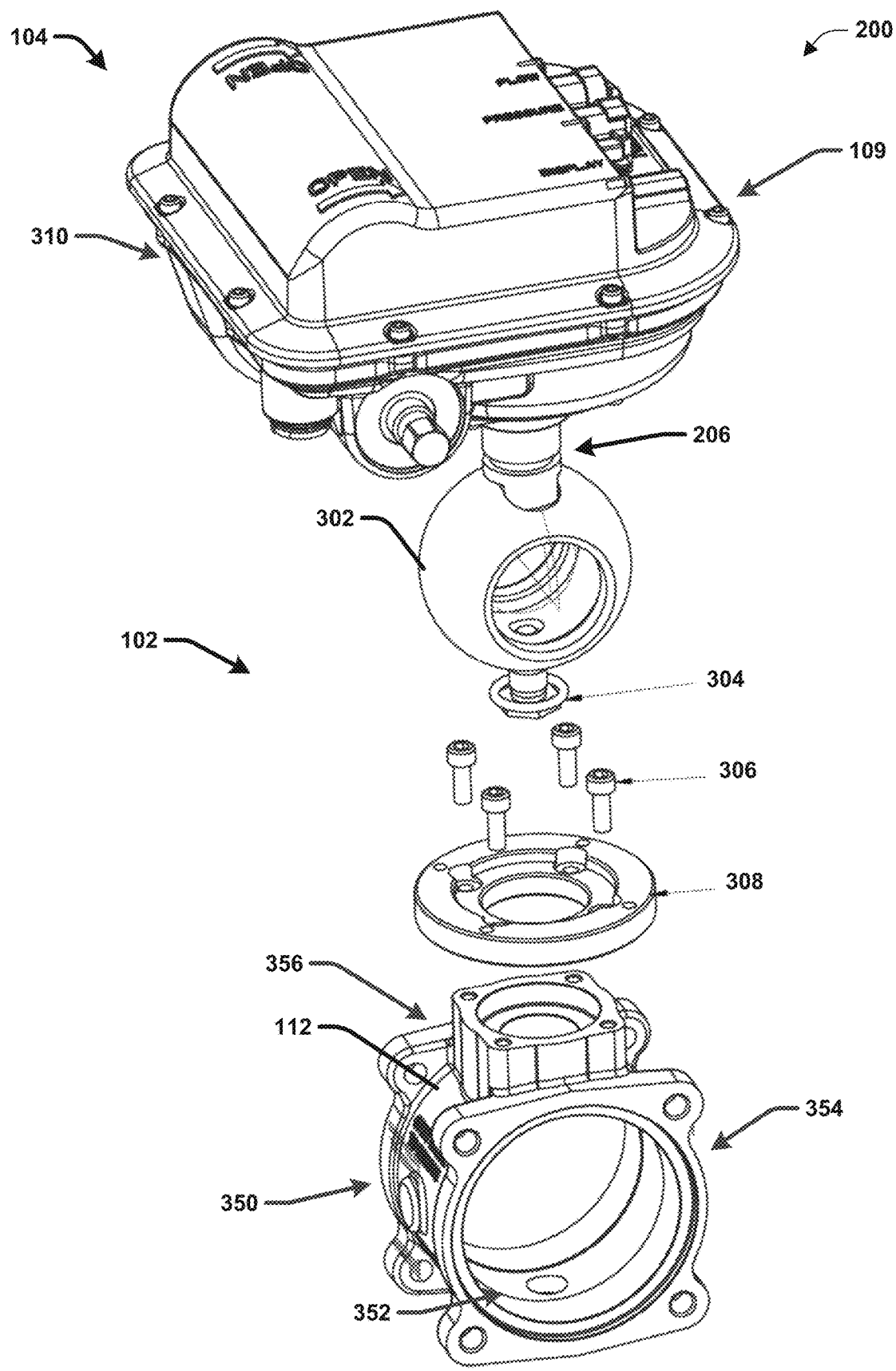
FIG. 3 is a component diagram illustrating an example implementation of one or more portions of one or more systems described herein.

FIG. 3 is a component diagram illustrating one example of how the actuator 104 may be coupled with the valve 102. In this implementation, the valve 102 comprises the valve ball 302, which is disposed inside the valve housing 112 such that it can freely rotate therein. The valve may also comprise a valve stem 304 disposed at the bottom of the valve ball, which can be inserted into the bottom of the interior of the valve housing 112 to provide an axis of rotation for the valve ball 302. A valve plate 306, along with valve plate fasteners 306 may be used to couple the actuator 104 with the valve 102. As illustrated, the trunnion 206 can be operably, fixedly engaged with the valve ball 302 to provide torque to rotate the ball 302 as needed, for example.

Figure 4:
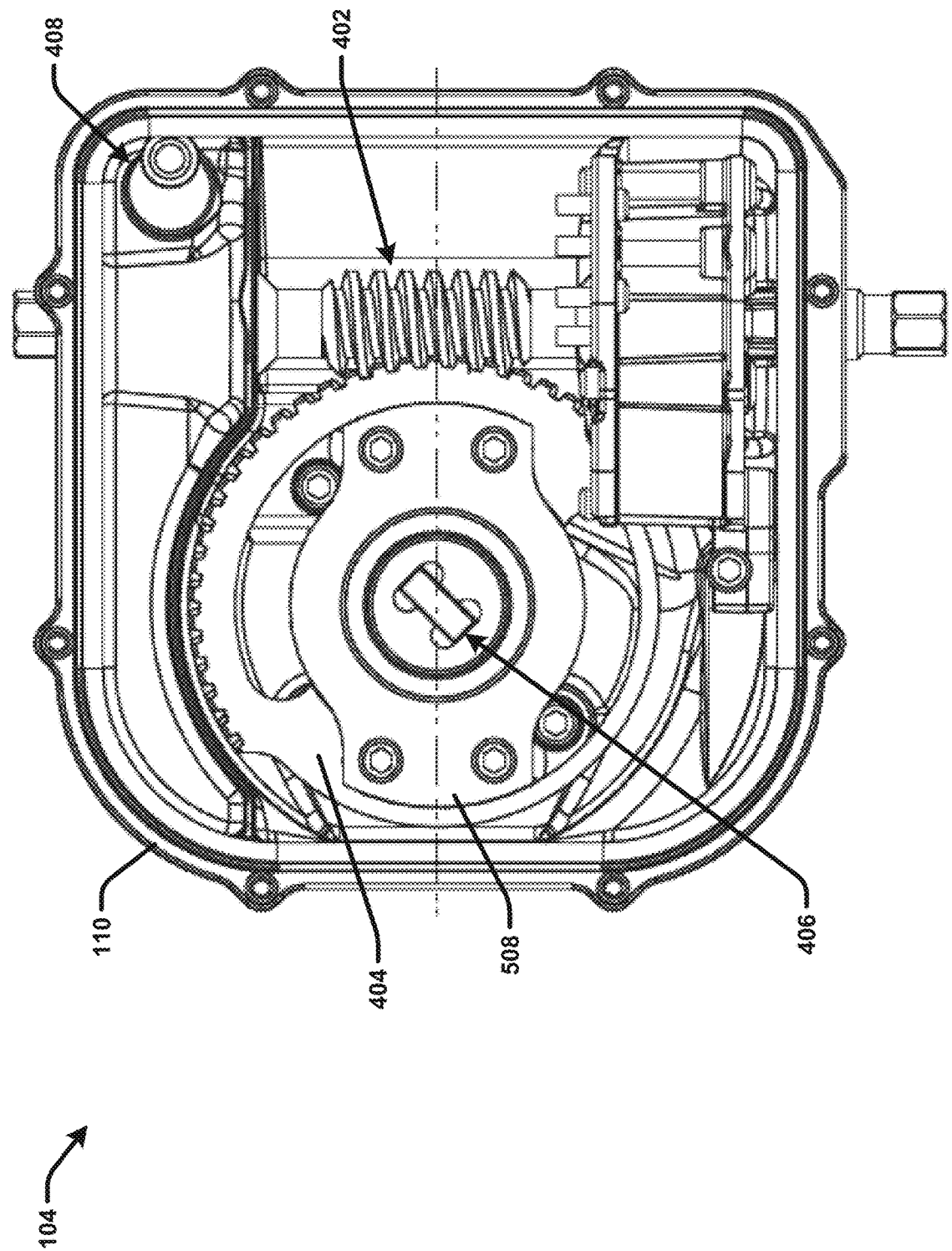
FIG. 4 is a component diagram illustrating a cut-away view of an example implementation of one or more portions of one or more systems described herein.

FIG. 4 is a component diagram illustrating a top-down, cut-away view of the interior of the actuator 104, showing a bottom portion of the actuator. In this implementation, a worm shaft gear 402, which is disposed in the housing 109, comprises threads that engage with teeth of a worm gear 404. The worm gear 404 is coupled with the trunnion 206 through a trunnion coupling 406. In this implementation, for example, rotation of the worm shaft gear 402 drives rotation of the worm gear, which rotates the coupled trunnion 206. In this example, as the trunnion 206 is coupled to the ball 302, rotation of the trunnion results in the ball 302 rotating inside the valve housing 112 of the valve 102. In this way, for example, the valve 102 can opened or closed (e.g., fully or partially) by rotating the worm shaft gear 402. In some implementations, a position indicator 406 (e.g., magnet or similar self-powered position indicator) can be disposed on the worm gear 404 or to the end of the trunnion 206, and may be used for position feedback of the trunnion 206, and therefore the ball in the valve. That is, for example, a position indicator 406 can be fixed rotate with the trunnion 206 or worm gear 404 to move an indicator outside of the housing 109 for an observer to view. As another example, the position indicator 406 may be operably coupled with a position sensor (not shown) that provides position data to the communications coupling 204. In one implementation, the lower housing 110 of the actuator 104 can comprise a housing vent 408 to allow fluid (e.g., air, water) to vent from the interior of the actuator 104.

The worm shaft gear 402 can comprise the manual actuator overrides 106, respectively disposed at either end. The manual actuator overrides 106 can be used to rotate the worm shaft gear 402, which rotates the worm gear 404. The worm gear 404 is engaged with the trunnion 206, which allows the ball 302 to be rotated in the valve 102. For example, this can be performed manually, even when the respective gears and motor are engaged.

Additionally, the arrangement of the worm gear 404 with the worm shaft gear 402 provides for self-locking of the worm gear 404, such that the worm gear teeth meshed with the teeth of the worm shaft gear 402 mitigate rotation of the worm gear 404 without provision of power to the worm shaft gear 402. That is, for example, flow of fluid through the valve 102 may impact the ball 302, which may apply rotational forces to the trunnion 206. In this example, because the trunnion 206 is engaged with the worm gear 404, and the gear teeth of the worm gear 404 are engaged with the teeth of the worm shaft gear 402 substantially orthogonally, undesired rotation of the trunnion 206 can be mitigated.

Further, the housing vent 408 can comprise a valve, screen, or membrane (e.g., a waterproof, breathable fabric that repels water while allowing water vapor to pass) that allows air and water vapor to vent out of the housing 110, but mitigates intrusion of fluid into the housing 110. For example, activating the actuator can result in a heat output inside the housing 110, 112 of the actuator 104, which may create a higher pressure inside the actuator. In this example, the increase in pressure may force air and water vapor out through the drain 408, and may mitigate intake of water when the actuator is not operating (e.g., and cooling). Further, for example, when the actuator cools, a vacuum may be created inside the actuator, drawing air inside. In this example, the vent 408 may mitigate intrusion of fluid, but allow for air to be drawn into the actuator 104.

Figure 5:
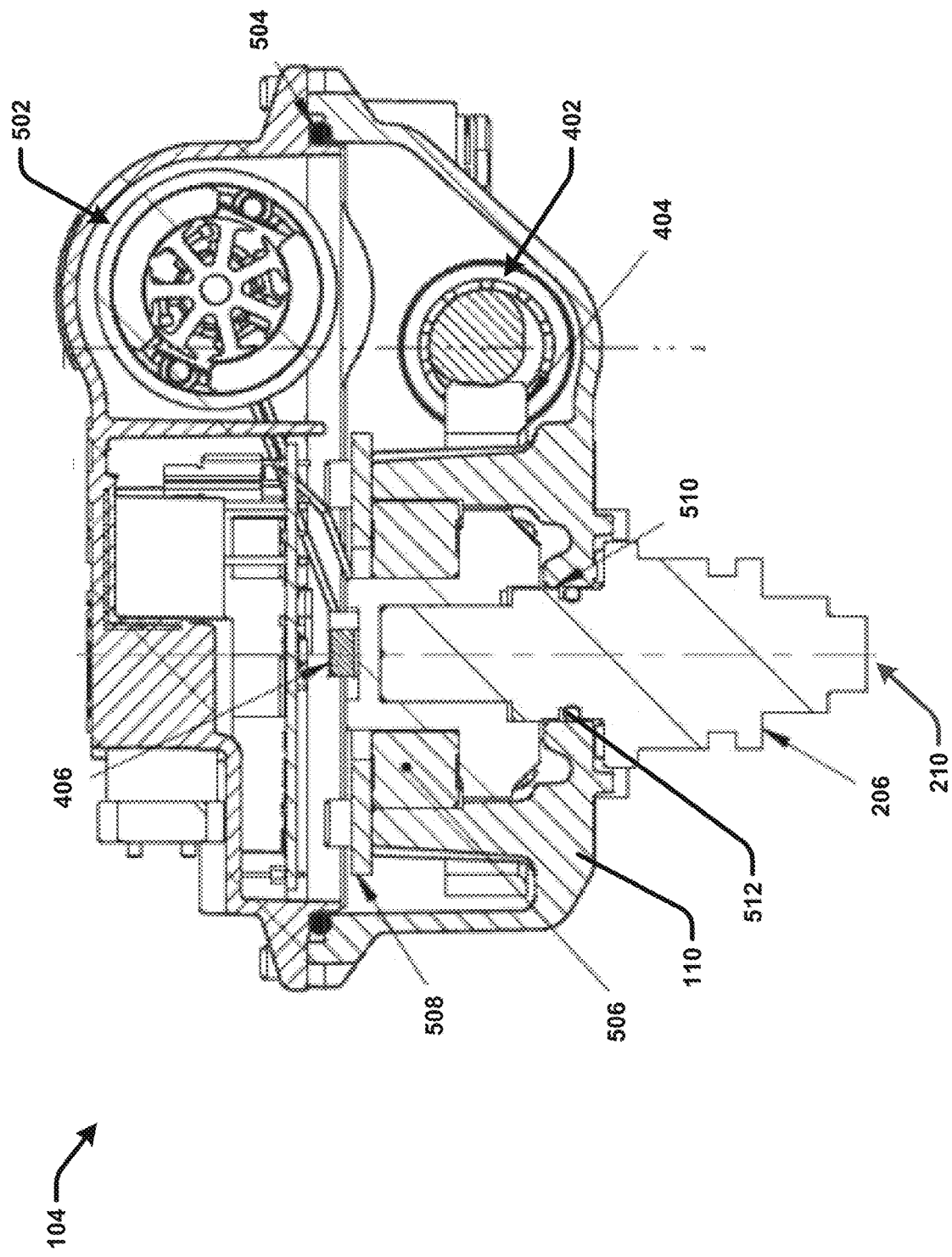
FIG. 5 is a component diagram illustrating a sectional cut-away view of an example implementation of one or more portions of one or more systems described herein.

FIG. 5 is a component diagram illustrating a side cut-away, sectional view of the actuator 104, showing a first side (e.g., front side) of the actuator 104. In this implementation, a motor 502 is disposed in the housing 109 and can be used to power the actuator 104. As an example, the motor 502 can provide rotational power, which, when coupled with one or more gears, can provide for the rotation of the worm shaft gear 402. As an example, the motor can be controlled by selectively providing electrical power, at a desired rate, for a desired amount of time, resulting in movement of the ball to a desired position. In some implementations, the electronic systems and controls for the motor can be housed inside the motor housing, and may not be exposed to fluid that intrude into the actuator 104. For example, a motor driver can receive electrical power and control inputs remotely. The driver can send current to the motor 502 that may be speed reduced and torque multiplied through a series of gears (e.g., planetary, parallel shaft, worm gear, etc.). For example, the speed reduction can be relatively high (e.g., 964.3:1). The output of the gear reduction rotates the trunnion 206, which can position the ball 302 according to the input from an operator.

Further, as illustrated, the actuator can comprise a housing gasket/seal 504, disposed around the perimeter where the top housing 112 and bottom housing 110 engage. The housing gasket/seal 504 can mitigate entry of contaminants (e.g., dirt, dust, fluids) into the interior of the actuator 104. A trunnion bearing 506, in combination with a centering plate 508, can be used to center and stabilize the worm gear 404 and trunnion 206 in the lower housing 110. The trunnion bearing 506 can help to improve position feedback accuracy of the ball 302, durability of the central pivot point/trunnion, and efficiency of the actuator as less power may be needed to rotate the trunnion 206. A trunnion shoulder 510 can be used to help hold a trunnion gasket/O-ring 512 in place, which can mitigate entry of contaminants into, and leakage of lubricating fluid out of, the actuator 104.

Figure 6:
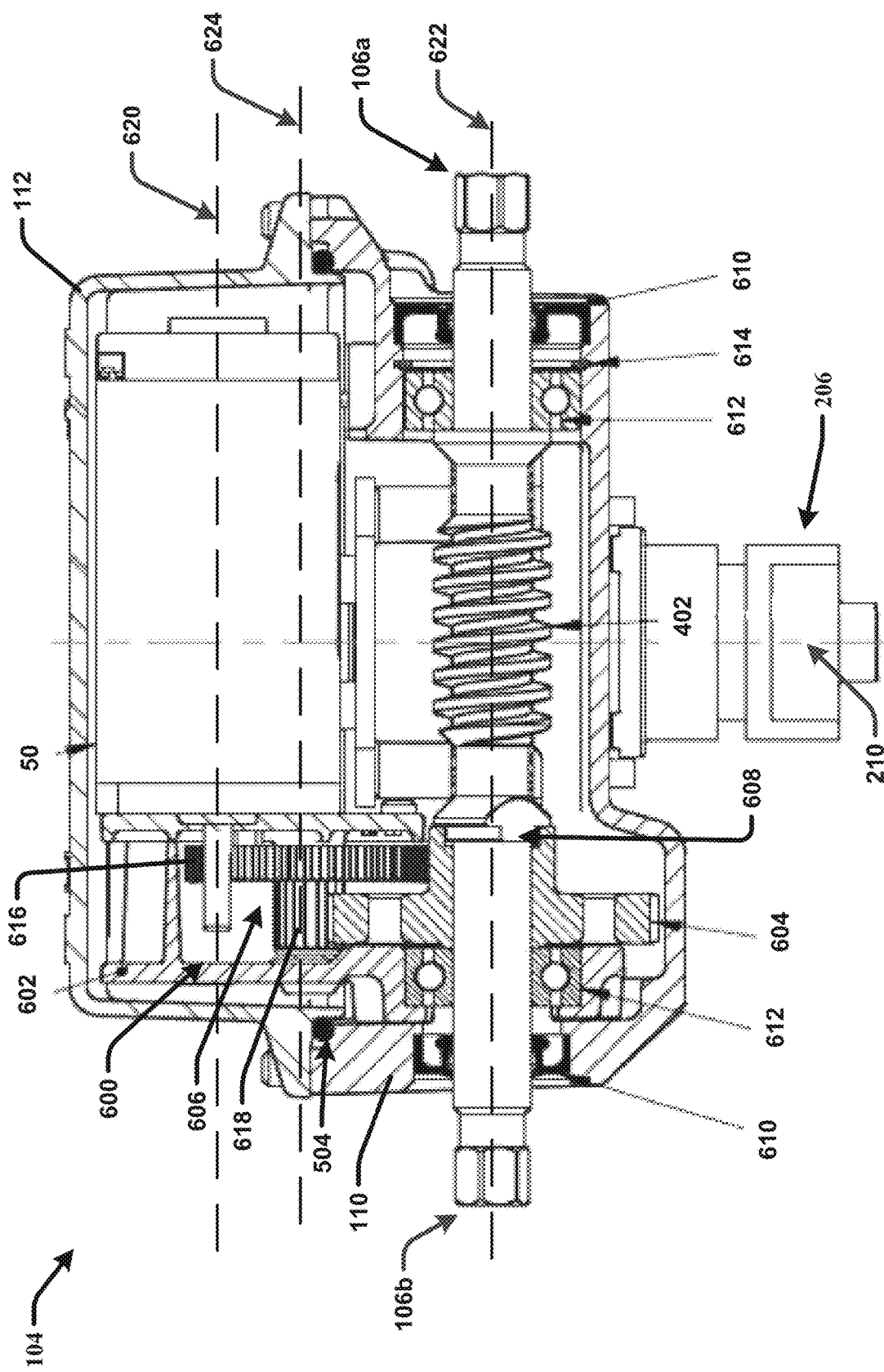
FIG. 6 is a component diagram illustrating a sectional cut-away view of an example implementation of one or more portions of one or more systems described herein.

FIG. 6 is a component diagram illustrating an alternate side cut-away, sectional view of the actuator 104, showing a second (e.g., right) side of the actuator 104. In this implementation, the actuator comprises a parallel shaft gearbox 602, which can be coupled with the motor 502. As illustrated, the motor 502 can be electrically controlled to operably rotate around a first horizontal axis 620, which is substantially orthogonal to the first vertical axis 210. The gearbox 602, which is housed in the housing 109, comprises a gear assembly 600, which can comprise a final spur gear 604, which is operably, fixedly engaged with the worm shaft gear 402 by a worm shaft coupling 608. As illustrated, the worm shaft gear 402 can be operably rotated around a second horizontal axis 622, which is substantially parallel to the first horizontal axis 620. In some implementations, the final spur gear 604 can be fixedly engaged with the worm shaft gear 402 without a coupling (e.g., 608), such as by being formed with, welded or soldered to, or otherwise adhered to the worm shaft gear 402. Further, the final spur gear 604 is operably, meshedly engaged with an intermediate spur gear 606.

The intermediate spur gear 606 transfers rotational power from the motor to the final spur gear 604, and can rotate around a third horizontal axis 624, which is substantially parallel to the first horizontal axis 620. Further, in some implementations, the intermediate spur gear 606 can comprise a first gear 616 and a second gear 618, comprising a desired gear ration between the first and second gears 616, 618. In some implementations, the first gear 616 can comprise a first diameter and the second gear 618 can comprise a second diameter. Additionally, the second diameter may be smaller than the first diameter (e.g., or vice versa). That is, for example, the gear ratio may be able to reduce the output rotational speed, while increasing the torque output. It will be appreciated that this type of spur gear arrangement in a planetary-type formation can be used to adjust the torque and/or speed output of the gear assembly 600 to a desired level of speed and/or torque.

In this example, as illustrated in FIG. 6, the actuator 104 can comprise one or more lip seals 610 between the worm shaft gear 402 and the housing 110. The lip seal 610 may provide a seal for the worm shaft gear 402, such as to mitigate intrusion of contaminants into the actuator, and/or mitigate leakage of lubricating fluids from the actuator along the shaft 402. Further, one or more worm shaft bearings 612 can be disposed on the worm shaft gear 402, to provide support for the worm shaft gear 402 during operation, and operably mitigate friction. For example, the gear motor centering can be important, as the worm shaft gear 402 is driven by the final spur gear 604 in the gear motor. Because the worm shaft gear 402 is centered in the housing 110 on the bearings 612, it provides stability and also helps center the gear assembly 600 and motor 502 to the worm shaft gear 402 and the housing 110. Additionally, one or more retaining rings 614 may be disposed on the shaft 402 to help retain the bearings 612 and worm shaft gear 402 in place during operation.

Figure 7A:
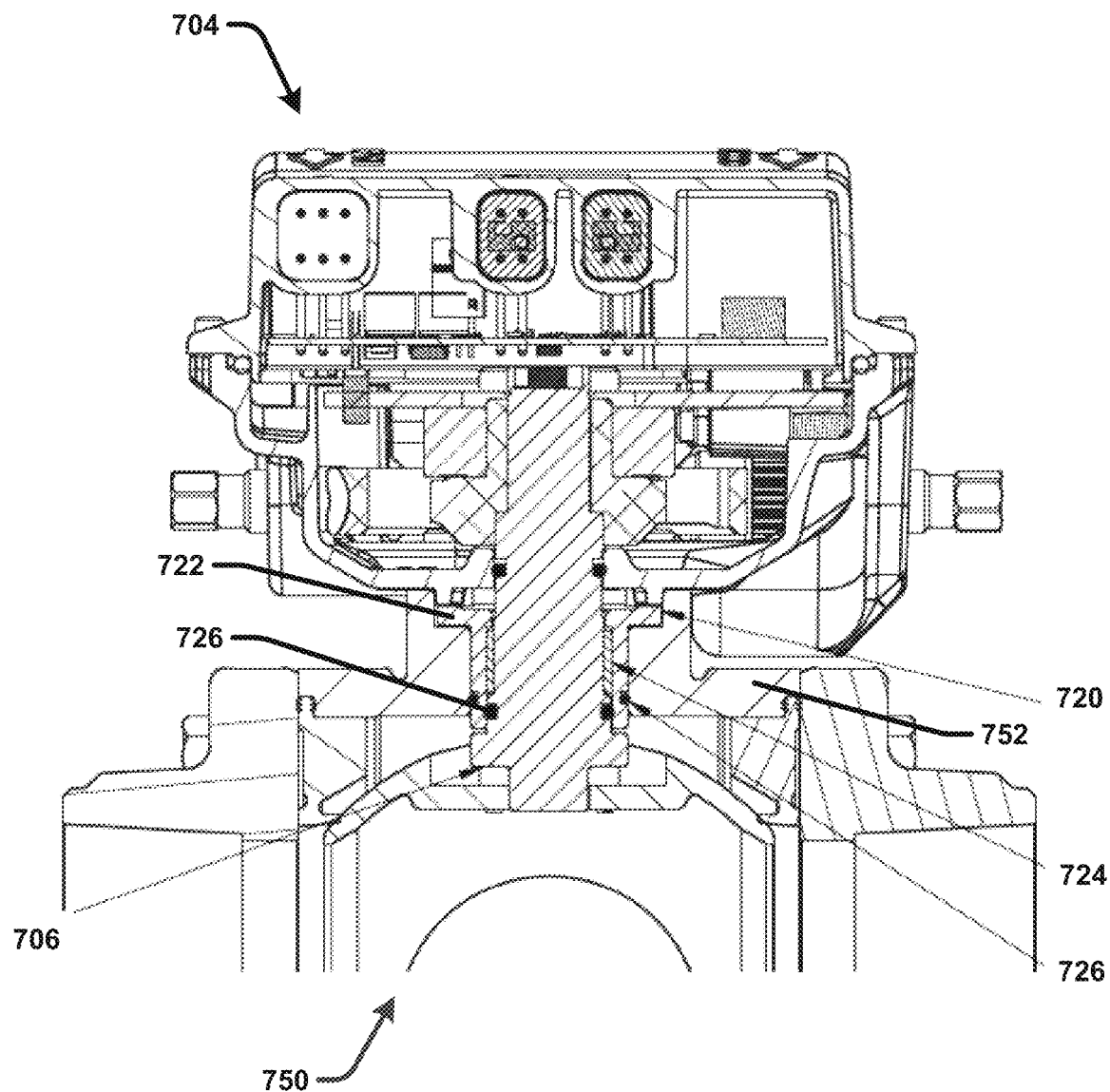
FIGS. 7A and 7B are component diagrams illustrating various views of an example alternate actuator implementation.
Figure 7B:
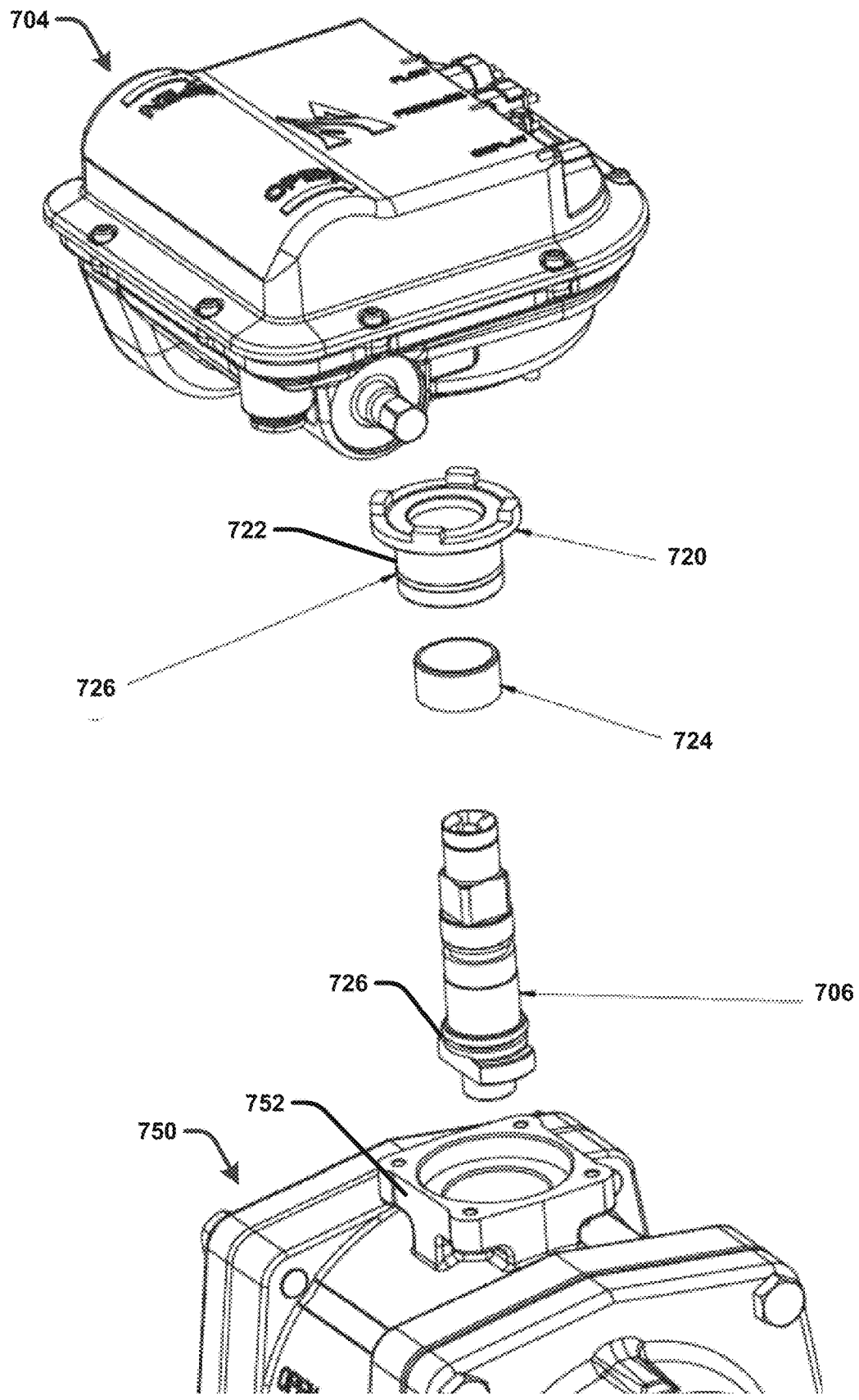

FIG. 7A is a component diagram illustrating a side cut-away, sectional view of an alternate implementation of an actuator 704, showing a first side (e.g., front side) of the actuator 704 coupled with a portion of a valve 750 (e.g., a ball valve). FIG. 7B is a component diagram illustrating an exploded view of the alternate actuator 704 that can be coupled with the valve 750. For example, the valve 750 comprises a valve body 752, and when the valve 750 (e.g., ball valve) is disposed in a closed position, water pressure can push against the valve 750, which can push the valve against trunnion 706. Further, in this example, the trunnion 706 can push against the valve body 752. In operation, for example, the actuator 704 has to overcome the friction of the pressure pushing against the valve 750, resulting in the trunnion 706 rubbing against the valve body 752. Therefore, reducing the friction allows the actuator 704 to perform more efficiently to turn the trunnion 706, and the actuator 704 may operate longer.

In this implementation, the actuator 704 is engaged with the valve 750 by a trunnion 706 to provide rotation power from the actuator 704 to the valve 750. Further, in this implementation, a bushing assembly 720 having a tubular body 722 can be comprised of a suitable material, such as metal (e.g., brass, steel, etc.), a polymer, composite (e.g., fiberglass, carbon composite), or other material suitable for use a bearing body. The bushing assembly 720 can be disposed on the trunnion 706, and comprise a bushing 724 operably disposed between (e.g., and in contact with) the bushing assembly body 722 and the trunnion 706. For example, the bushing 724 can be comprised of a suitable polymer, for example, one that acts as a dry lubricant like Teflon or the like. As an example, the bushing 724 can be press fit into the bushing assembly body 722 to operably receive the trunnion 706. Additionally, a seal 726 (e.g., an O-ring) can be operably disposed between (e.g., and in contact with) the outer side of the bushing assembly body 722 and the valve body 752. For example, the bushing assembly body 722 can comprise a channel that operably houses the bushing assembly seal 726. In this implementation, a trunnion seal 726 (e.g., O-ring) can be disposed in a channel on the outer surface of the trunnion 706 in contact with an inner surface of the bushing assembly body 722.

Figure 8:
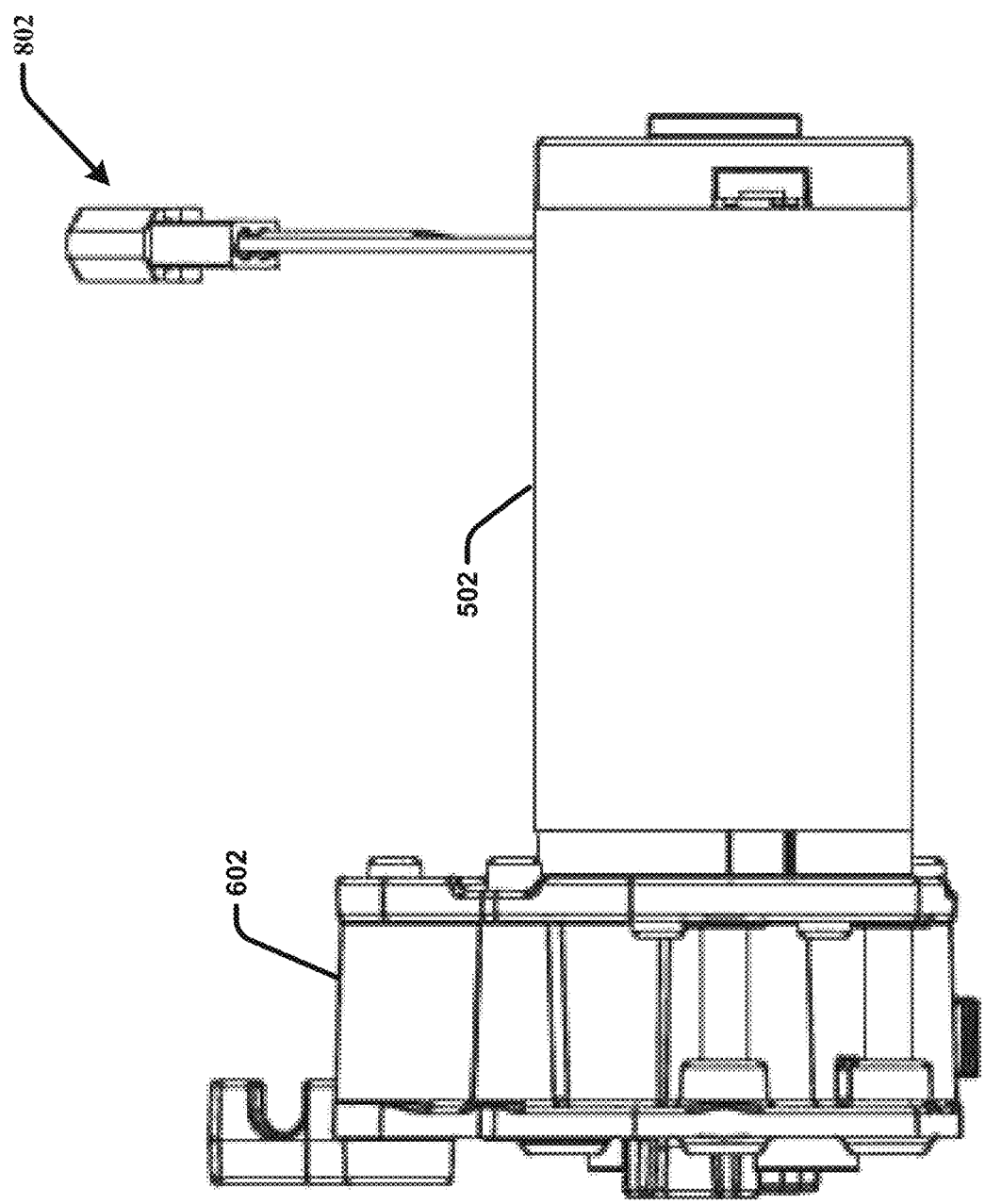
FIG. 8 is a component diagram illustrating an example implementation of an actuator implemented in one or more portions of one or more systems described herein.

FIG. 8 is a component diagram illustrating one implementation of a portion of the actuator. In this implementation, the motor 502 comprises a power coupling 802. The power coupling can be selectably engaged with a power source to provide electrical power to the motor. Further, the motor is operably, fixedly engaged with the parallel shaft gearbox 602, which comprise one or more gears to translate the rotational force provided by the motor 502 to rotational force applied to the worm shaft gear 402.

Figure 9:
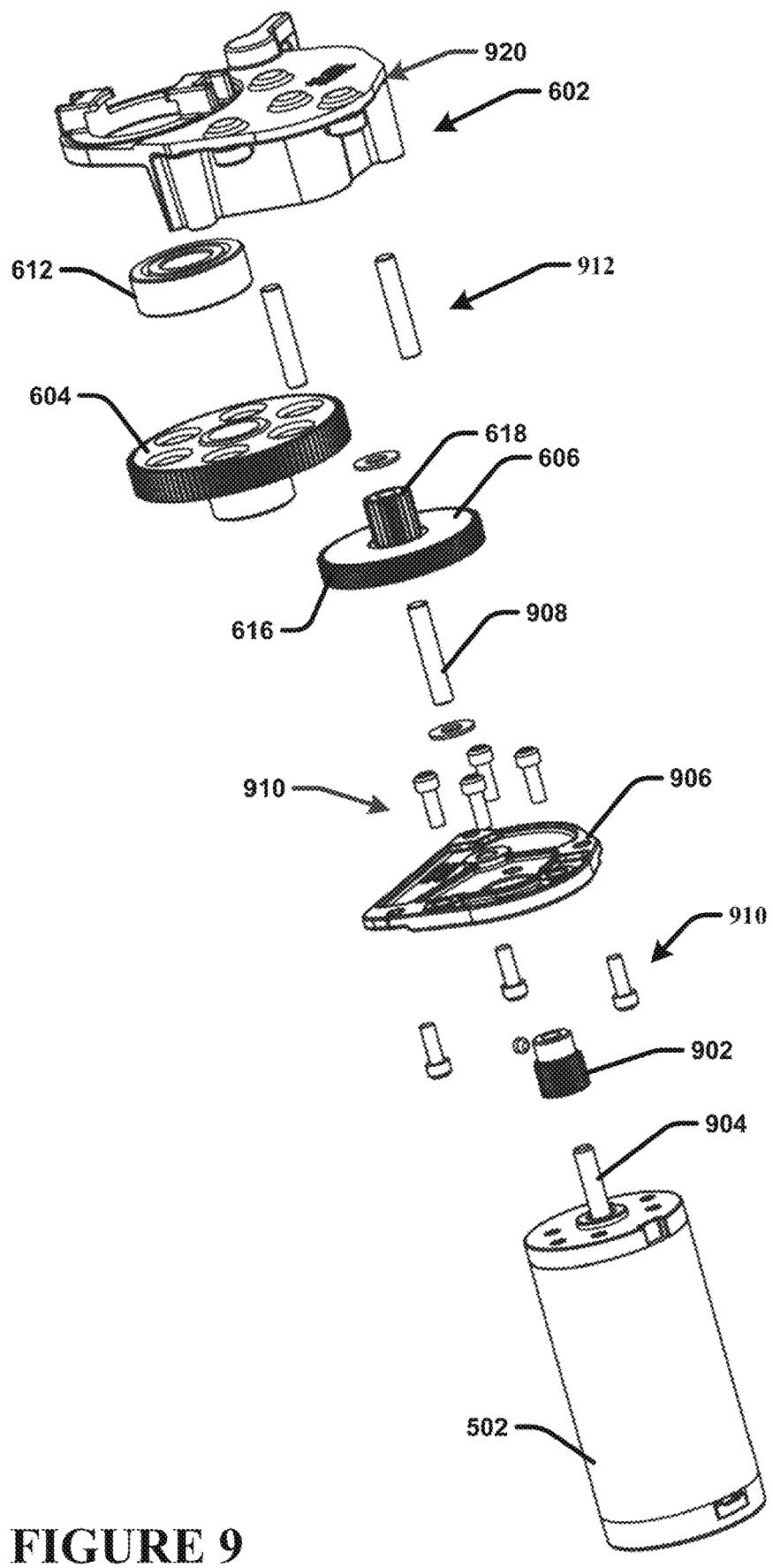
FIG. 9 is a component diagram illustrating an exploded view of an example implementation of one or more portions of an actuator implemented in one or more systems described herein.

FIG. 9 is a component diagram illustrating an exploded view of the combination motor 502 and gearbox 602 of FIG. 8. In this implementation, a motor spur gear 902 can be engaged with a motor shaft 904 of the motor. In this way, for example, rotation of the motor 502 under electrical power can rotate the motor shaft 904, which rotates the motor spur gear 902. The motor spur gear 902 can be meshedly engaged with the intermediate spur gear 606, such as at an outer gear portion. An inner gear portion of the intermediate spur gear 606 can be meshedly engaged with the final spur gear 604. In operation, the worm shaft gear 402 can be disposed through a central portion of the final spur gear 604, and through the worm shaft bearing 612.

In this implementation, the gearbox 602 comprises a body having an end plate 920, and can comprise a motor plate 906, which can be used to operably, fixedly couple the motor 502 with the gearbox 602, using one or more gearbox fasteners 910. Further, the intermediate gear 606 can be rotational coupled inside the gearbox using an intermediate spur gear shaft 908 disposed therethrough, and engaged with the gearbox 602 and motor plate 906. Additionally, one or more gearbox spacers 912 can be disposed in the gearbox 602 between the motor plate 906 and an opposing wall of the gearbox 602 to provide adequate operational space for the gears disposed therein.

Figures 10A, 10B:
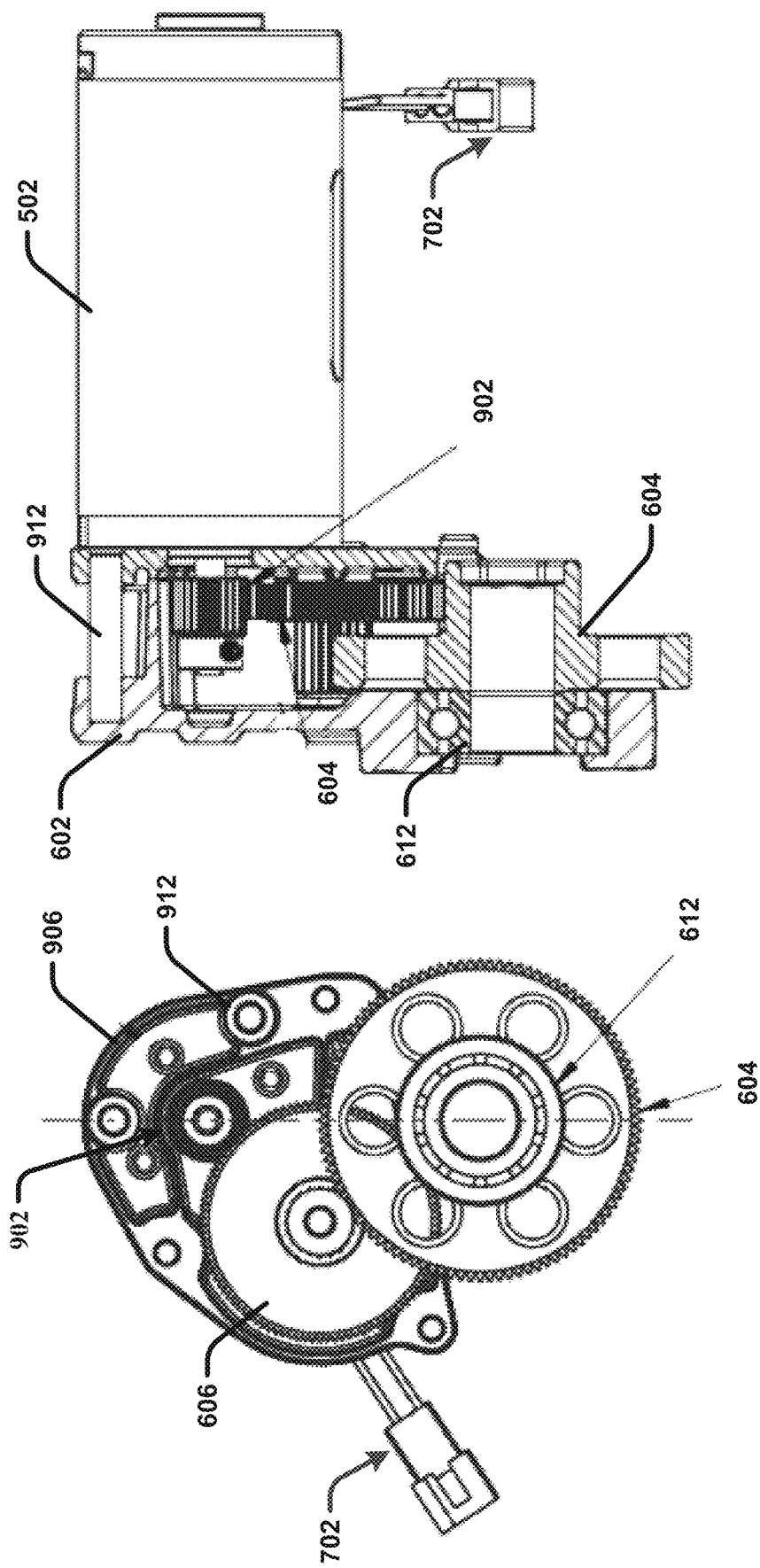
FIGS. 10A and 10B are component diagrams illustrating views of an example embodiment of one or more portions of an actuator which may be implemented in one or more systems described herein.

FIGS. 10A and 10B are component diagrams that illustrate an example implementation of gear arrangements in the gearbox 602. FIG. 10A is a view of the inside of the gearbox 602, facing the motor plate 906 at the rear; and FIG. 10B is a view of the gearbox and motor 502 from the worm gear side of the actuator. As illustrated, the motor spur gear 902 is disposed inside the gearbox 602, and is meshedly engaged with the intermediate spur gear 606. The inner gear portion of the intermediate spur gear 606 is meshedly engaged with the final spur gear 604, which is engaged with the worm shaft gear 402. A bearing 612 can be disposed on the worm shaft gear 402 proximate the final spur gear 604. One or more gearbox spacers 912 are disposed in the gearbox 602.

FIGS. 11A and 11B are component diagrams that illustrate and example implementation of the gear arrangements in the gearbox 602, and motor assembly. FIG. 11A is a view of the gearbox 602 and motor 502 from the motor side of the actuator, which lies in parallel to the worm gear 402. FIG. 11B is a view of the back of the gearbox 602, from the rear of the motor plate 502. As illustrated, the intermediate gear 606 is rotationally engaged with the intermediate spur gear shaft 908, which is held in place in the gearbox 602 using a cavities in the motor plate 906 and front wall of the gearbox 602. The intermediate spur gear 606 is meshed with the final spur gear 604, and meshed with the motor spur gear 902. In FIG. 11B, a retainer ring 614 can be used to retain the bearing 612 and worm shaft gear 402 together. The power coupling 802 can provide electrical power to the motor 502.

Figure 12:
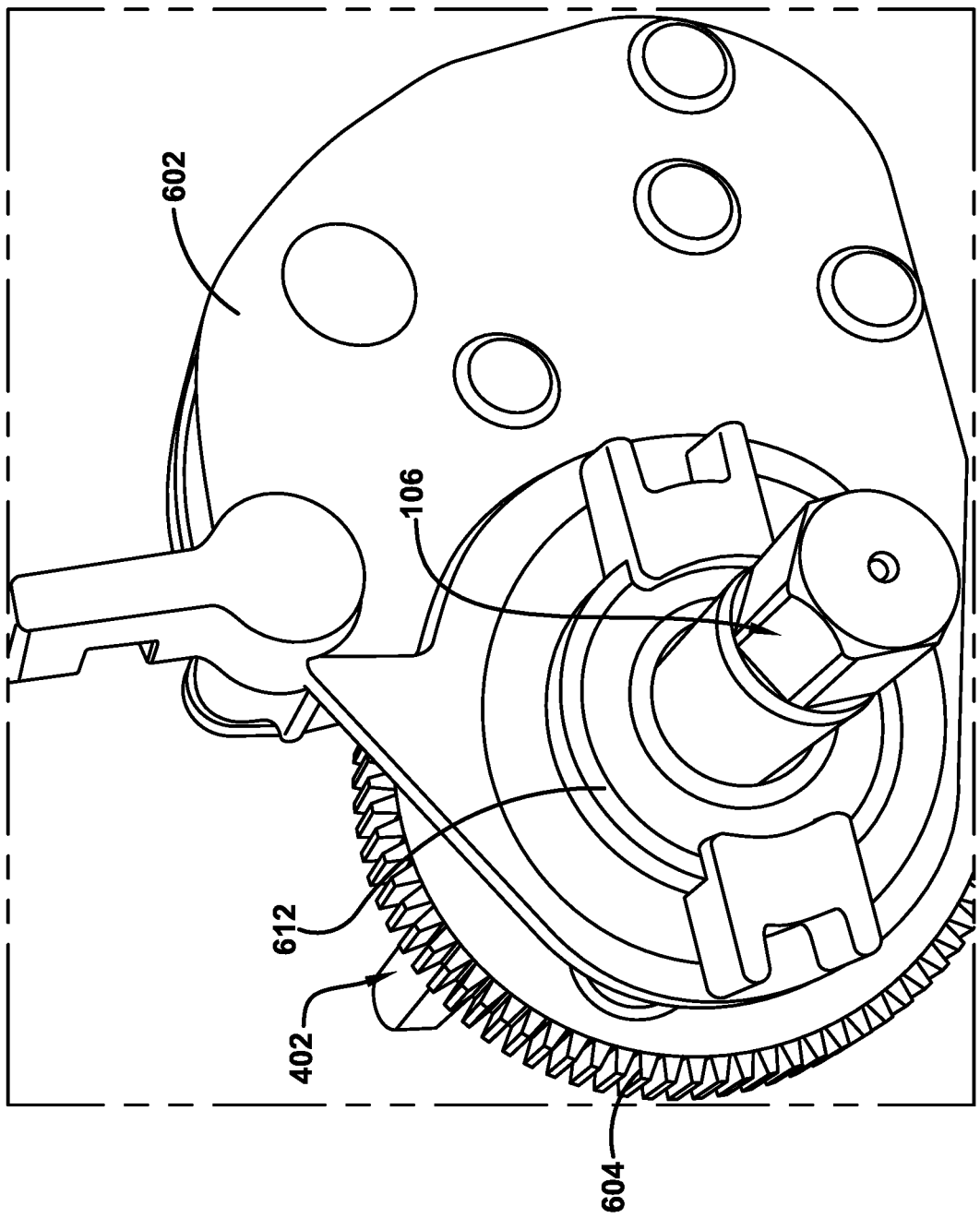
FIG. 12 is a component diagram illustrating an example implementation of an actuator implemented in one or more portions of one or more systems described herein.
Figure 13:
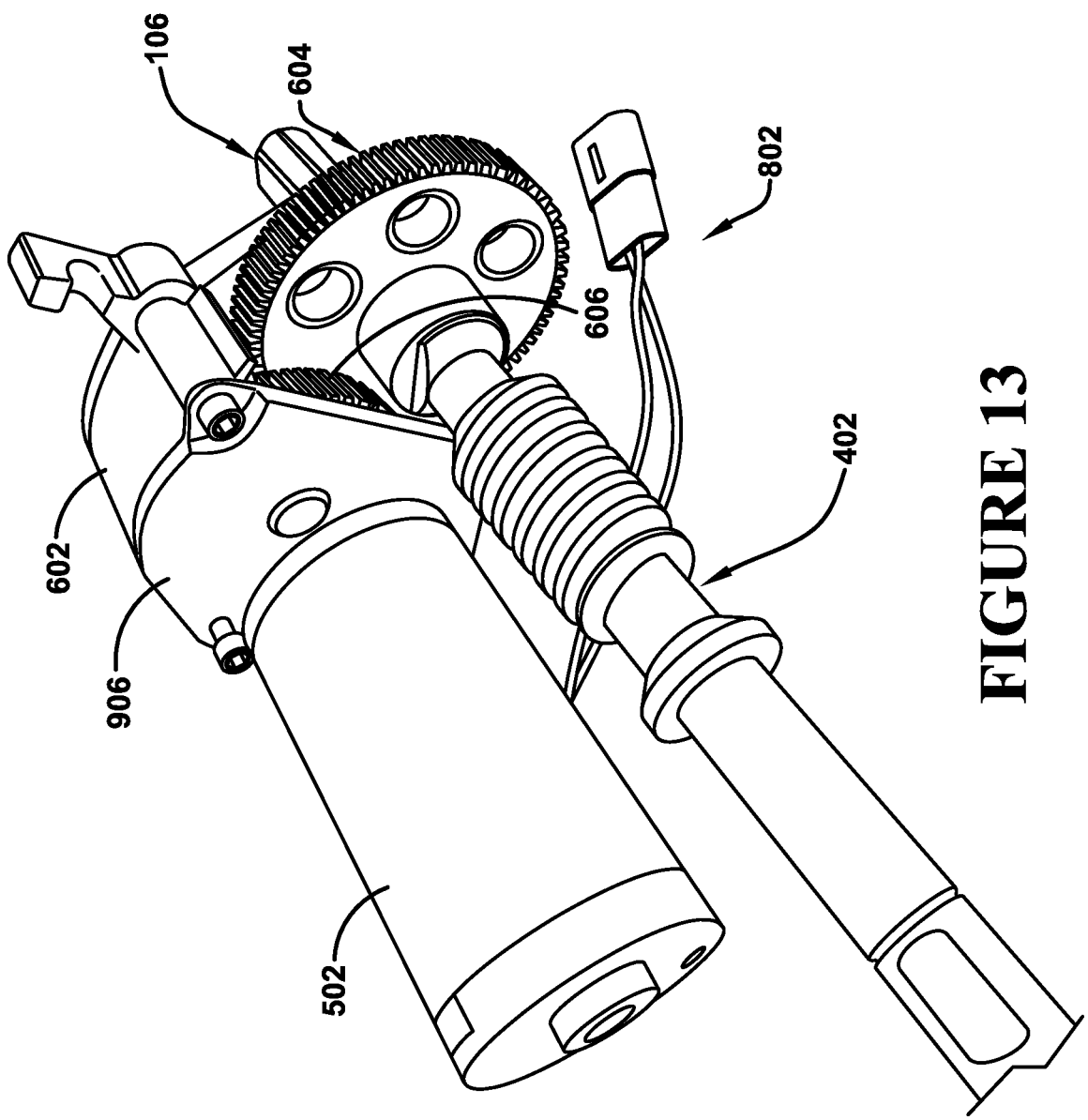
FIG. 13 is a component diagram illustrating an example implementation of an actuator implemented in one or more portions of one or more systems described herein.

FIG. 12 illustrates a component diagram of one implementation of a portion of the gearbox 602. In this implementation, the front or the gearbox 602 is shown, with a bearing 612 operably engaged with the worm shaft gear 402. Further, the final spur gear 604 is shown operably engaged with the worm shaft gear 402. Additionally, a manual actuator override 106 is disposed on one of the ends of the worm shaft gear 402. In FIG. 13, which illustrates an example portion of the actuator at least partially disassembled, the motor 502, coupled with the motor plate 906, is disposed in parallel alignment with the worm shaft gear

402. This arrangement can provide for a more compact design of the actuator than existing actuators, which can provide a smaller footprint, and less stress on the pivotal engagement with the trunnion 206 and ball 302. Further, the gear alignment provided between the motor 502 and worm shaft gear 402, in the gearbox 602, allows for improved torque and speed control, providing for fine adjustment of the ball 302 in the valve 102. That is, for example, having the motor align with the worm shaft gear 402, and not in line with the trunnion as is found in typical designs, provides for the compact design, with more efficiency. In this implementation, the arrangement of the motor 502 positioned substantially central over the valve and actuator, can help mitigate operational moment, which reduces vibrations over current designs. For example, this can help reduce maintenance and repair, and provides for greater efficiency.

Additionally, the worm shaft gear 402 comprising manual actuator overrides 106 disposed at respective ends, allows for manual operation of the valve at either side of the actuator. For example, the dual manual override can be accessible to an operator from two sides (e.g., the front or back). For example, the motor positioning and sizing (e.g., and improved efficiency) helps for reduction of the actuator packaging size. A pump compartment where valves are typically installed can be very compact, and packaging and accessibility are important factors. In this example, the dual override can provide value in adding options for accessibility to the override as well as assembly options.

It will be appreciated that the one or more systems, described herein, are not limited merely to the implementations listed above. That is, it is anticipated that the example fire suppression systems can be configured to operably engage with additional or alternate control components, such as devised by those skilled in the art. For example, another fire suppression control component may be devised that provides additional functionality to the fire suppression system (e.g., improves performance, and/or provides functionality for different conditions, such as different types of fires or situations). In this example, it is anticipated that the control component may be configured to communicatively couple with the example communication network, and operate in a distribute network, for example, transmitting state data to the network, and/or receiving state data from other control components engaged with the network.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Reference throughout this specification to "one implementation," "an implementation," "one embodiment," or "an embodiment" means that a particular feature, structure, or characteristic described in connection with the implementation is included in at least one implementation or embodiment. Thus, the appearances of the phrases "in one implementation/embodiment" or "in an implementation/embodiment" in various places throughout this specification are not necessarily all referring to the same implementation or embodiment. Furthermore, the particular features, structures, or characteristics may be combined in any suitable manner in one or more implementations or embodiments. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising." Various operations of implementations are provided herein. The order in which some or all of the operations are described should not be construed as to imply that these operations are necessarily order dependent. Alternative ordering will be appreciated by one skilled in the art having the benefit of this description. Further, it will be understood that not all operations are necessarily present in each implementation provided herein.

What is claimed is:

1. A valve actuator, comprising:
   a housing;
   a trunnion projecting from a bottom of the housing, the trunnion rotating around a first vertical axis to operably provide rotational power to a coupled valve assembly;
   a motor that is electrically controlled disposed in the housing that operably provides rotational power around a first horizontal axis;
   a worm shaft gear disposed in the housing and rotating around a second horizontal axis, the second horizontal axis disposed substantially parallel to the first horizontal axis;
   a gear assembly disposed in the housing, the gear assembly coupled with the motor and the worm shaft gear to operably transfer the rotational power from the motor to the worm shaft gear;

a worm gear engaged with the worm shaft gear and the trunnion, the worm gear operably rotating around the first horizontal axis to provide rotational power to the trunnion;

a first manual actuator override comprising a shaft that rotates around the first horizontal axis, the first manual actuator shaft having a first end disposed outside of the housing at a first side, and a second end disposed inside the housing in a fixed direct engagement with a first end of the worm shaft gear, wherein the first manual actuator override is configured to operably, selectably receive a manual actuator override handle, and wherein rotation of the first manual actuator override operably rotates the worm shaft gear.

2. The actuator of claim 1, comprising a second manual actuator override comprising a shaft that rotates around the first horizontal axis, the second manual actuator shaft having a first end disposed outside of the housing at a second side, and comprising a second, opposing end disposed inside the housing in in fixed direct engagement with a second end of the worm shaft gear, wherein the second manual actuator override is configured to operably, selectably receive the manual actuator override handle, and wherein rotation of the second manual actuator override operably rotates the worm shaft gear.

3. The actuator of claim 1, the gear assembly comprising an intermediate gear rotating around a third horizontal axis and coupled with a motor spur gear disposed on a motor shaft of the motor, wherein the third horizontal axis is disposed between and substantially parallel to the first horizontal axis and the second horizontal axis.

4. The actuator of claim 3, the intermediate gear comprising a first gear comprising a first diameter, and a second gear comprising a second, smaller diameter.

5. The actuator of claim 3, comprising a final gear operably, fixedly engaged with the worm shaft gear and operably rotating in the second horizontal axis, the final gear assembly meshedly engaged with the intermediate gear.

6. The actuator of claim 1, the housing comprising a top portion and a bottom portion, the bottom portion configured to be selectably fastened to a valve assembly in four different configurations comprising: a front side of the housing aligned with a first side of the valve assembly, the front side of the housing aligned with a second side of the valve assembly, the front side of the housing aligned with a third side of the valve assembly, and the front side of the housing aligned with a fourth side of the valve assembly.

7. The actuator of claim 1, comprising one or more communications ports that respectively operably couple with one or more of:
a flow sensor system that identifies fluid flow characteristics a coupled valve;
a pressure sensor system that identifies fluid pressure in the coupled valve; and
a user interface system that operably provides data to a user interface and receives data from the user interface.

8. The actuator of claim 1, comprising a position indicator engaged with the worm gear, the position indicator operably providing an indication of position of the worm gear outside of the housing.

9. The actuator of claim 1, comprising a trunnion bearing fixedly engaged with the housing and operably disposed around the trunnion to allow the trunnion to rotate freely in the housing.

10. The actuator of claim 1, comprising a stabilizer plate that is fixedly engaged with the housing and operably engaged with at least a portion of the gear assembly to allow free rotation of trunnion inside the housing.

11. The actuator of claim 1, comprising a bushing assembly disposed on the portion of the trunnion that is external to the housing, the bushing assembly comprising:
a body that is tubular comprising a seal channel disposed on an outer surface of the body to operably hold a seal; and
a bushing disposed around an inner surface of the body and in contact with the trunnion.

12. The actuator of claim 1, the motor comprising an electrical power coupling to operably couple with an electrical source to provide electrical power to the motor.

13. The actuator of claim 1, the housing comprising a vent that operably allows fluid to exit the housing while mitigating intrusion of liquid into the housing.

14. The actuator of claim 1, comprising a gear box disposed in the housing, the gear box operably housing a motor spur gear engaged with a motor shaft, an intermediate gear meshedly engaged with the motor spur gear, and at least a portion of a final gear that is engaged with the worm shaft gear.

15. An actuator assembly that is used to control a valve, comprising:
a housing comprising an upper portion and lower portion;
a motor disposed in the housing, the motor electrically powered to rotate a motor shaft around a first horizontal axis;
a gear assembly disposed in the housing, at least a portion of gear assembly is disposed in a gear box, the gear assembly comprising:
a motor spur gear operably fixed to the motor shaft;
an intermediate gear meshedly engaged with the motor spur gear to operably rotate around a third horizontal axis that is substantially parallel to the first horizontal axis;
a worm shaft gear meshedly engaged with the intermediate gear to operably rotate around a second horizontal axis that is substantially parallel to the first horizontal axis; and
a worm gear meshedly engaged with the worm shaft gear to operably rotate around a first vertical axis that is substantially orthogonal to the first horizontal axis;
a first manual actuator override comprising a shaft that rotates around the first horizontal axis, the first manual actuator shaft having a first end disposed outside of the housing at a first side, and a second end disposed inside the housing fixedly engaged directly with a first end of the worm shaft gear, wherein the first manual actuator override is configured to operably, selectably receive a manual actuator override handle, and wherein rotation of the first manual actuator override operably rotates the worm shaft gear; and
a trunnion comprising a first end and a second end, the first end fixedly engaged with the worm gear in the housing, and the second end projecting from the bottom portion of the housing to operably couple with a valve assembly.

16. The assembly of claim 15, comprising a second manual actuator override comprising a shaft that rotates around the first horizontal axis, the second manual actuator shaft having a first end disposed outside of the housing at a second side, and a second end disposed inside the housing in in fixed direct engagement with a second end of the worm shaft gear, wherein the second manual actuator override is configured to operably, selectably receive the manual actuator override handle, and wherein rotation of the first or second manual actuator override operably rotates the worm shaft gear.

17. The assembly of claim 15, wherein the bottom portion of the housing is configured to be selectably fastened to a valve assembly in four different configurations comprising: a front side of the housing aligned with a first side of the valve assembly, the front side of the housing aligned with a second side of the valve assembly, the front side of the housing aligned with a third side of the valve assembly, and the front side of the housing aligned with a fourth side of the valve assembly.

18. The assembly of claim 15 comprising a bushing assembly disposed on the second end of the trunnion, the bushing assembly comprising:
 a tubular body comprising a seal channel disposed on an outer surface of the body to operably hold a seal; and
 a bushing disposed around an inner surface of the body and in contact with the trunnion.

19. A method of manufacturing a valve actuator, comprising:
 disposing a trunnion in an actuator housing such that the trunnion is projecting from a bottom of the housing, wherein the trunnion operably rotates around a first vertical axis to provide rotational power to a coupled valve assembly;
 disposing a worm gear in fixed engagement with the trunnion in the housing, such that the worm gear rotates around the first vertical axis;
 disposing a worm shaft gear in the housing in meshed engagement with the worm gear, wherein the worm shaft gear operably rotates around a second horizontal axis, and the worm gear comprises a manual actuator override disposed outside of the housing to manually operate the worm gear from outside the housing;
 disposing a gear assembly in the housing in meshed engagement with the worm shaft gear;
 disposing an electrically controlled motor in the housing that is fixedly engaged with at least a portion of the gear assembly to operably provide rotational power to the gear assembly, resulting in rotation of the worm shaft gear, rotation of the worm gear, and rotation of the trunnion, wherein the motor rotates around a first horizontal axis that is substantially parallel to the second horizontal axis, and is substantially orthogonal to the first vertical axis; and
 disposing a first manual actuator override comprising a shaft that rotates around the second horizontal axis, the first manual actuator shaft having a first end disposed outside of the housing at a first side, and a second end fixedly engaged directly with a first end of the worm shaft gear, wherein the first manual actuator override is configured to operably, selectably receive a manual actuator override handle, and; and
 disposing a second manual actuator override comprising a shaft that rotates around the first horizontal axis, the second manual actuator shaft having a first end disposed outside of the housing at a second side, and a second end in fixed direct engagement with a second end of the worm shaft gear, wherein the second manual actuator override is configured to operably, selectably receive the manual actuator override handle, and wherein rotation of the first or second manual actuator override operably rotates the worm shaft gear.

\* \* \* \* \*